(12) United States Patent
Frenken

(10) Patent No.: US 8,777,536 B2
(45) Date of Patent: Jul. 15, 2014

(54) CABLE LUG COMPRISING A NUT OR FUNCTIONAL PART, METHOD FOR THE PRODUCTION OF SUCH A CABLE LUG, AND NUT

(75) Inventor: Egbert Frenken, Heinsberg (DE)

(73) Assignee: Gustav Klauke GmbH, Remscheid (DE)

( * ) Notice: Subject to any disclaimer, the term of this patent is extended or adjusted under 35 U.S.C. 154(b) by 901 days.

(21) Appl. No.: 12/396,023

(22) Filed: Mar. 2, 2009

(65) Prior Publication Data

US 2009/0162135 A1 Jun. 25, 2009

Related U.S. Application Data

(63) Continuation of application No. 10/597,668, filed as application No. PCT/EP2005/055176 on Oct. 12, 2005, now abandoned.

(30) Foreign Application Priority Data

Oct. 15, 2004 (DE) .......................... 10 2004 050 485
Feb. 17, 2005 (DE) .......................... 10 2005 007 203

(51) Int. Cl.
*F16B 37/04* (2006.01)
*F16B 37/06* (2006.01)
*F16B 41/00* (2006.01)

(52) U.S. Cl.
CPC ............. *F16B 37/068* (2013.01); *F16B 41/002* (2013.01); *Y10S 411/968* (2013.01)
USPC .......................... 411/180; 411/533; 411/968

(58) Field of Classification Search
USPC ............ 411/180, 533, 968, 999; 29/434, 437, 29/505, 515–521
See application file for complete search history.

(56) References Cited

U.S. PATENT DOCUMENTS 1,946,064 A * 2/1934 Creveling ........................ 285/39
2,026,757 A * 1/1936 Swanstrom ................... 411/180

(Continued)

FOREIGN PATENT DOCUMENTS

BE 558873 1/1958
DE 2 162 523 6/1973

(Continued)

OTHER PUBLICATIONS

Prosecution History of United States Patent No. 8,021,091 (128 pages).

*Primary Examiner* — Flemming Saether
(74) *Attorney, Agent, or Firm* — Klintworth & Rozenblat IP LLC

(57) ABSTRACT

A cable lug and a method of use is provided. The cable lug has a receiving tube section for a cable, a flat piece-connecting section that is molded on and is provided with a bore, and a nut which is captively and preferably rotatably mounted on the flat piece-connecting section. The nut does not penetrate the flat piece-connecting section while being mounted by a shaped mounting material section of the flat piece-connecting section, which extends into an undercut in the nut. The mounting material section is in the undercut with an axial clearance. The mounting material section is rooted in a lowered in a step-type manner in the flat piece-connecting section. The lowered area is rotationally symmetrical and is provided with a conical section which opens outward and vertically and encompasses at least one conical area.

48 Claims, 11 Drawing Sheets

(56) References Cited

U.S. PATENT DOCUMENTS

| | | | | |
|---|---|---|---|---|
| 2,486,769 A * | 11/1949 | Watson, Jr. | ............. | 411/180 |
| 3,000,420 A | 9/1961 | Spokes | | |
| 3,133,579 A | 5/1964 | Grimm et al. | | |
| 3,137,336 A * | 6/1964 | Wing | ............. | 411/135 |
| 3,238,581 A | 3/1966 | Sawyer | | |
| 3,253,631 A | 5/1966 | Reusser | | |
| 3,270,355 A * | 9/1966 | Tildesley | ............. | 470/20 |
| 3,861,774 A | 1/1975 | Willis | | |
| 3,891,296 A | 6/1975 | Gutshall | | |
| 4,329,768 A | 5/1982 | Tranberg et al. | | |
| 4,370,794 A | 2/1983 | Bien et al. | | |
| 4,519,747 A * | 5/1985 | Yamazaki et al. | ............. | 416/244 A |
| 4,893,976 A * | 1/1990 | Milliser et al. | ............. | 411/180 |
| 4,969,788 A | 11/1990 | Goiny | | |
| 5,256,019 A | 10/1993 | Phillips, II | | |
| 5,308,285 A | 5/1994 | Malen et al. | | |
| 5,431,517 A | 7/1995 | Hoelle et al. | | |
| 5,513,933 A * | 5/1996 | Rom | ............. | 411/180 |
| 5,743,691 A | 4/1998 | Donovan | | |
| 5,791,175 A | 8/1998 | Van Wyk | | |
| 5,797,175 A | 8/1998 | Schneider | | |
| 5,842,894 A | 12/1998 | Mehlberg | | |
| 5,975,821 A | 11/1999 | Kue | | |
| 6,220,801 B1 | 4/2001 | Lin | | |
| 6,343,962 B2 | 2/2002 | Krause | | |
| 6,486,402 B2 | 11/2002 | Harger et al. | | |
| 6,644,903 B1 | 11/2003 | Arand | | |
| 6,817,815 B2 | 11/2004 | Ross | | |
| 6,866,456 B2 | 3/2005 | Bentrim | | |
| 6,932,044 B1 | 8/2005 | Fenech | | |
| 7,374,382 B2 | 5/2008 | Bentrim | | |
| 8,021,091 B2 * | 9/2011 | Bentrim | ............. | 411/180 |
| 2001/0008817 A1 | 7/2001 | Krause | | |
| 2006/0099047 A1 | 5/2006 | Bentrim | | |
| 2008/0206013 A1 | 8/2008 | Bentrim | | |

FOREIGN PATENT DOCUMENTS

| | | |
|---|---|---|
| DE | 25 45 581 | 4/1977 |
| DE | 37 04 763 | 10/1988 |
| DE | 692 09 554 | 11/1996 |
| DE | 103 10 164 | 10/2003 |
| DE | 600 17 871 | 4/2006 |
| EP | 0 437 011 | 7/1991 |
| EP | 0 667 936 | 8/1995 |
| EP | 0 694 988 | 1/1996 |
| EP | 0 951 098 | 10/1999 |
| EP | 1 264 996 | 12/2002 |
| FR | 2 758 661 | 7/1998 |
| GB | 1 524 047 | 9/1978 |
| JP | 07-151126 | 6/1995 |
| WO | 01/13467 | 2/2001 |
| WO | 2004/084351 | 9/2004 |
| WO | 2006/052491 | 5/2006 |

* cited by examiner

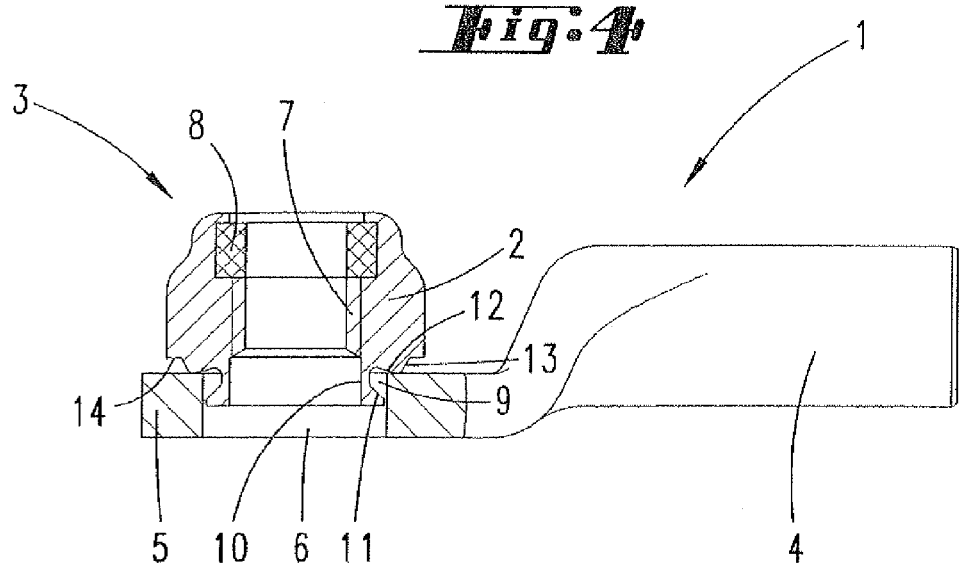
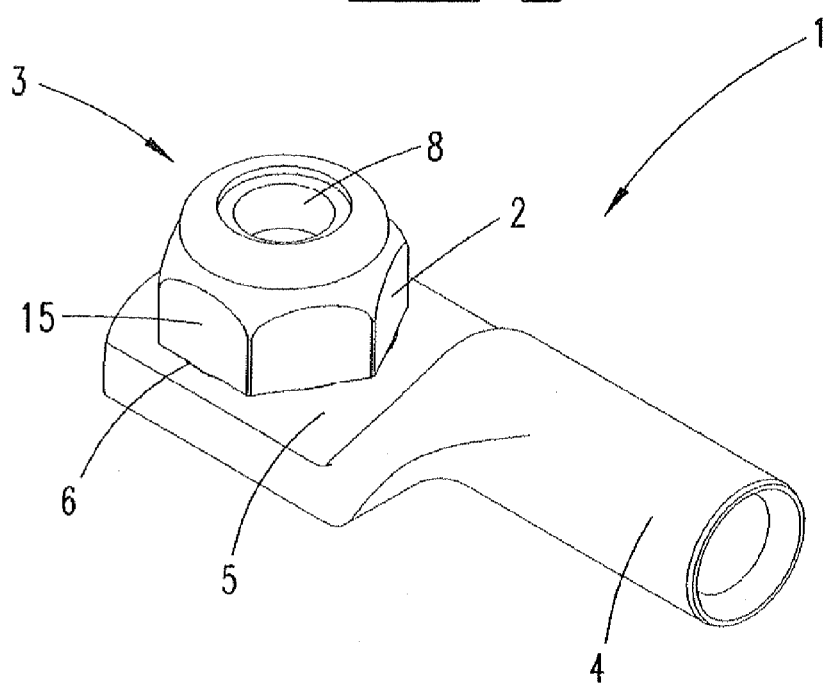

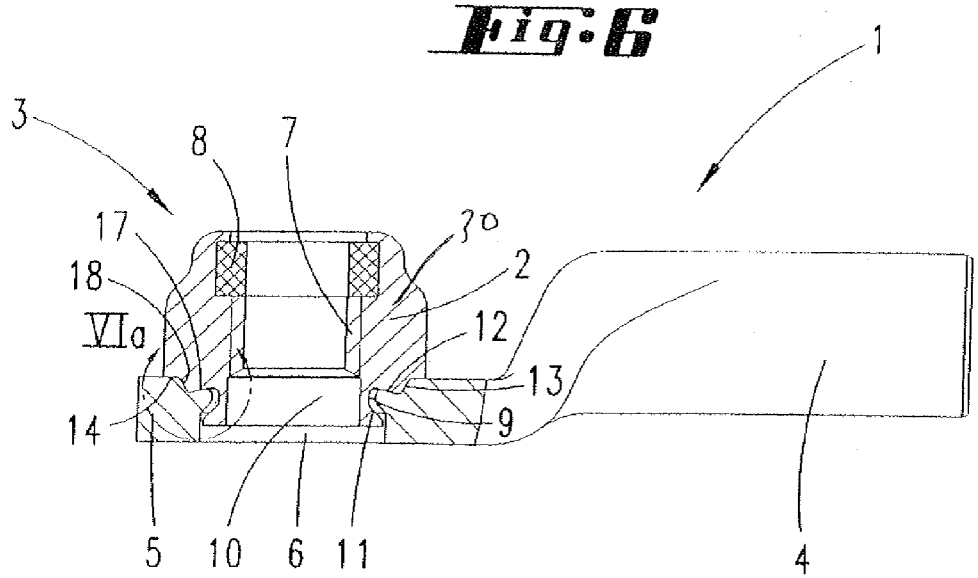
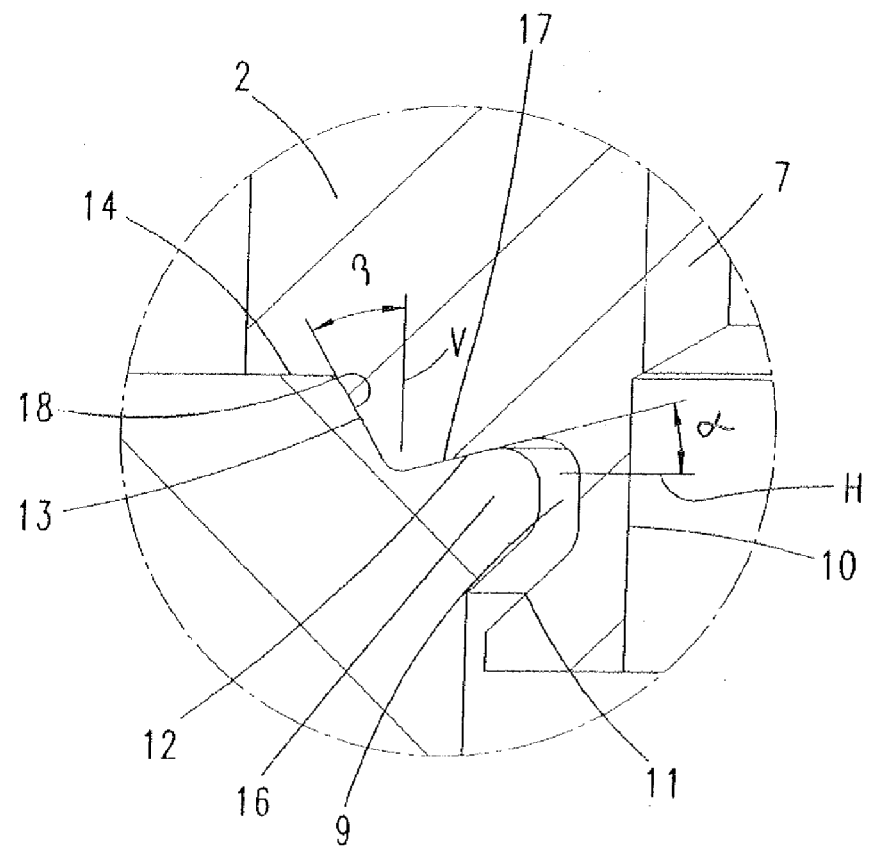

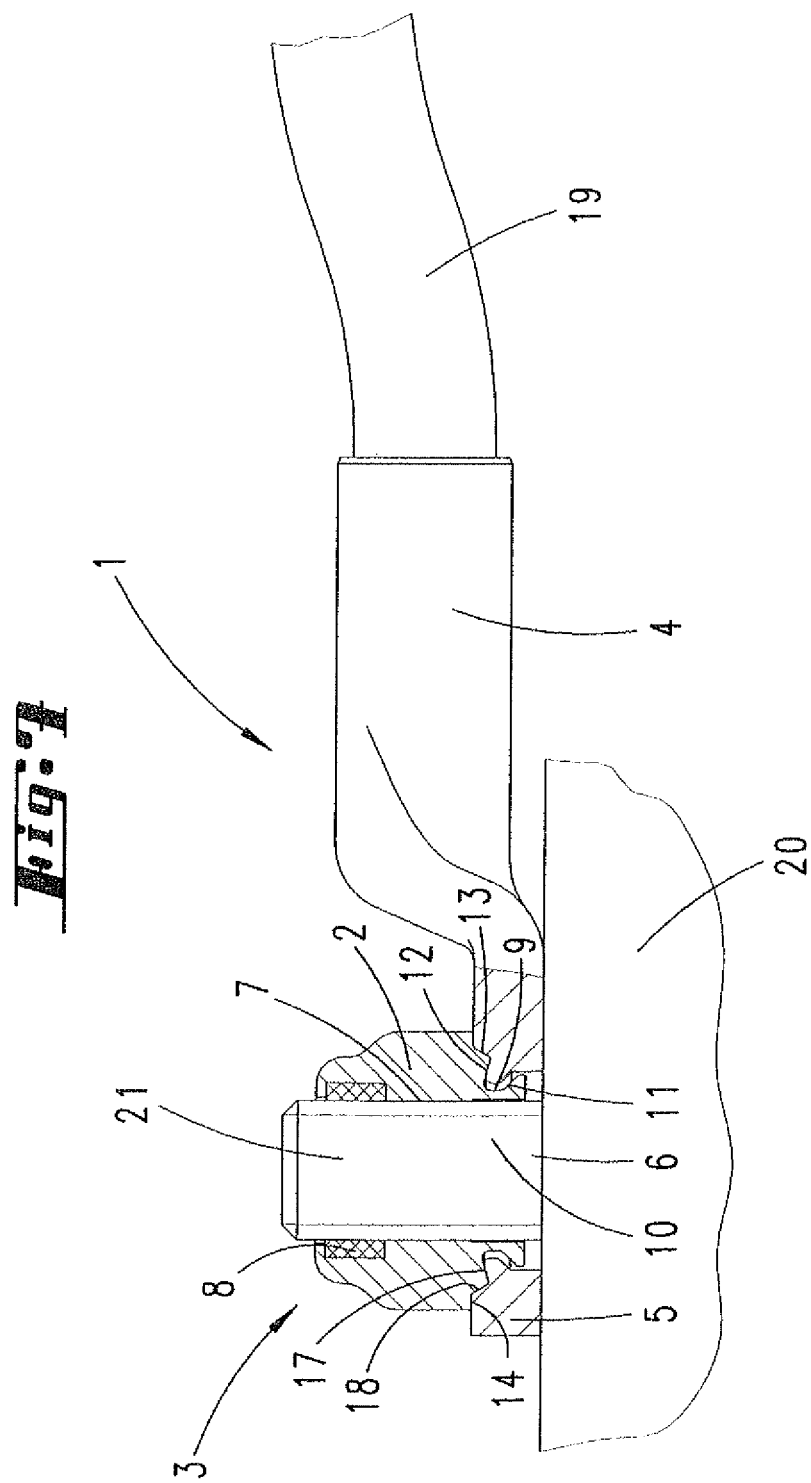

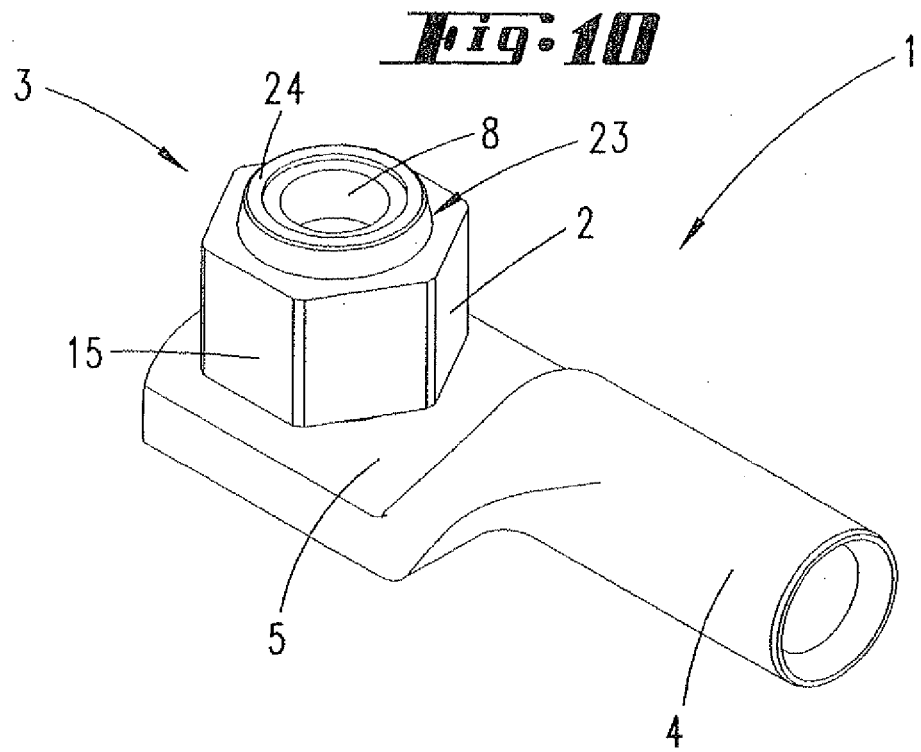
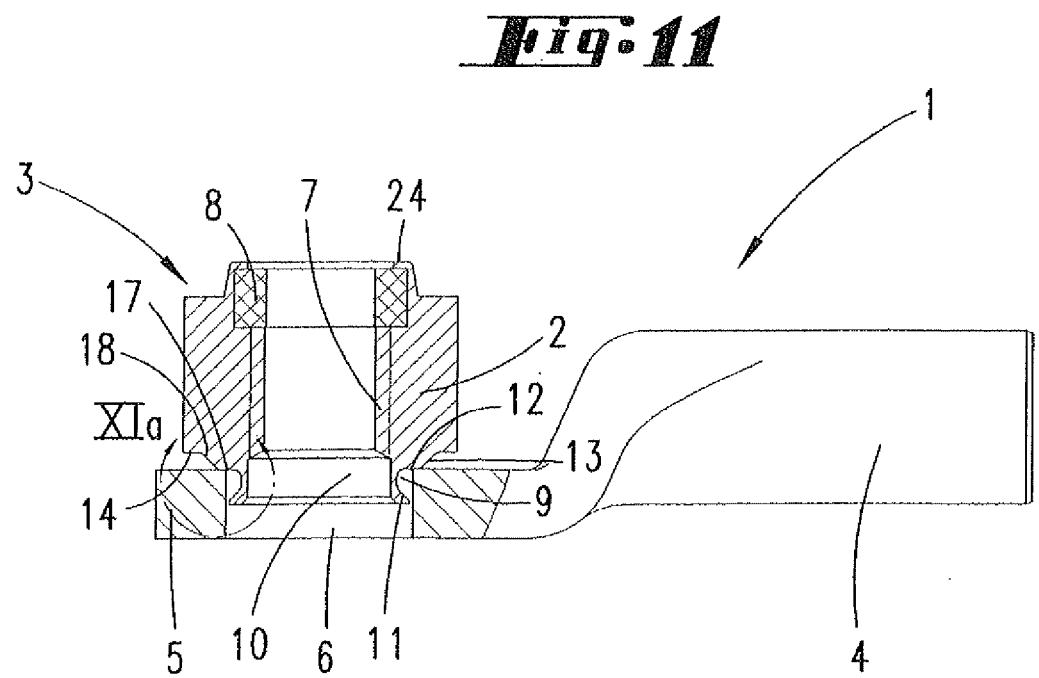

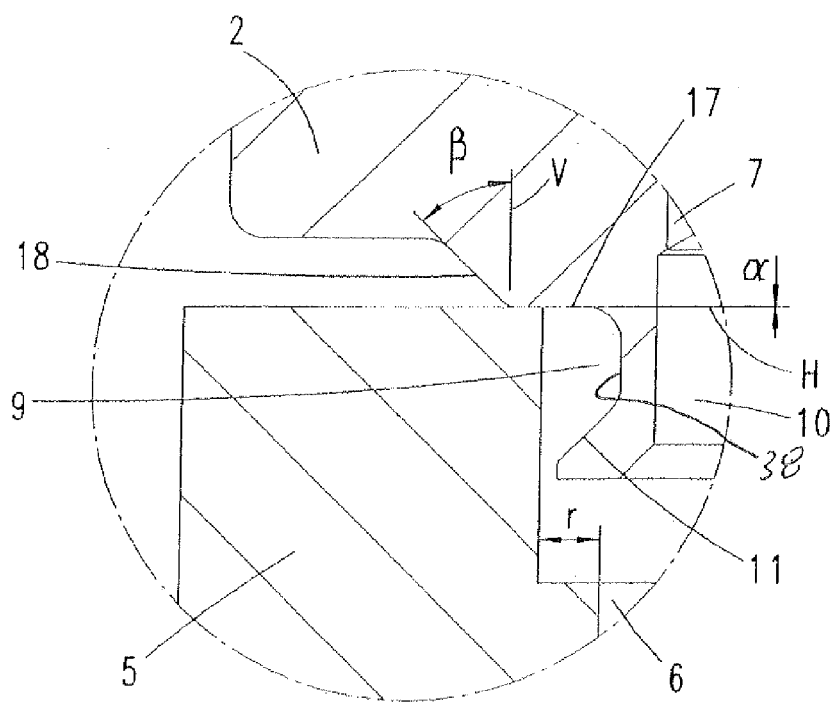
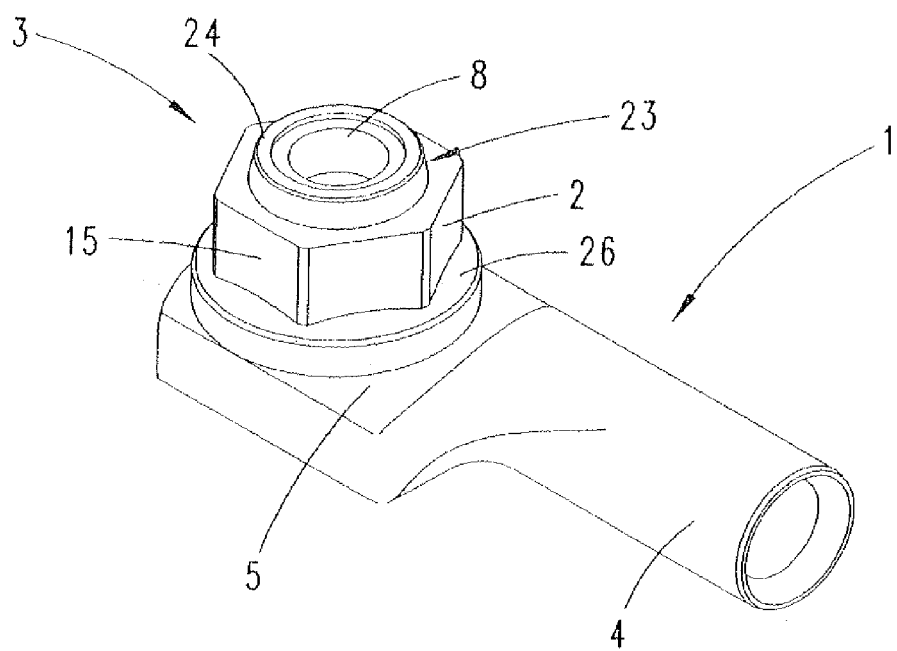

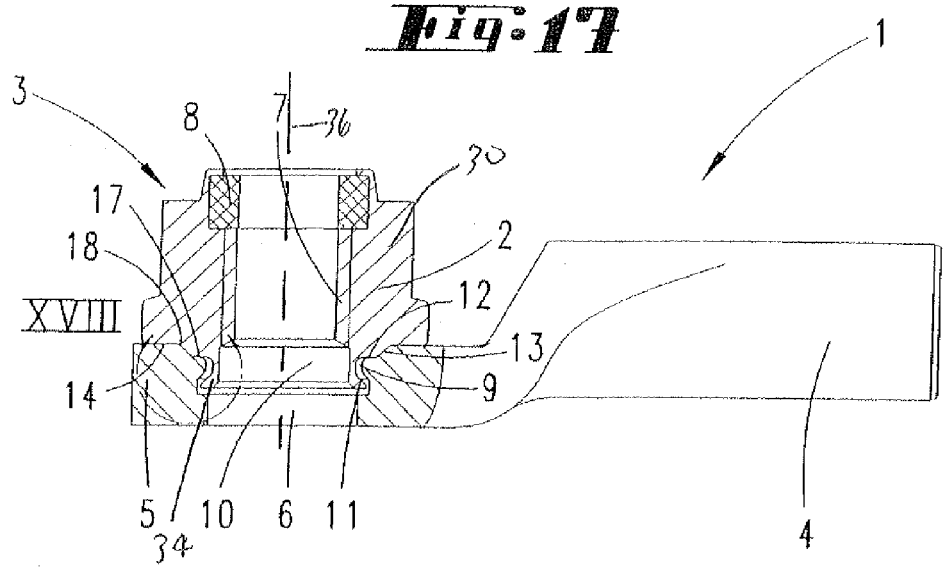
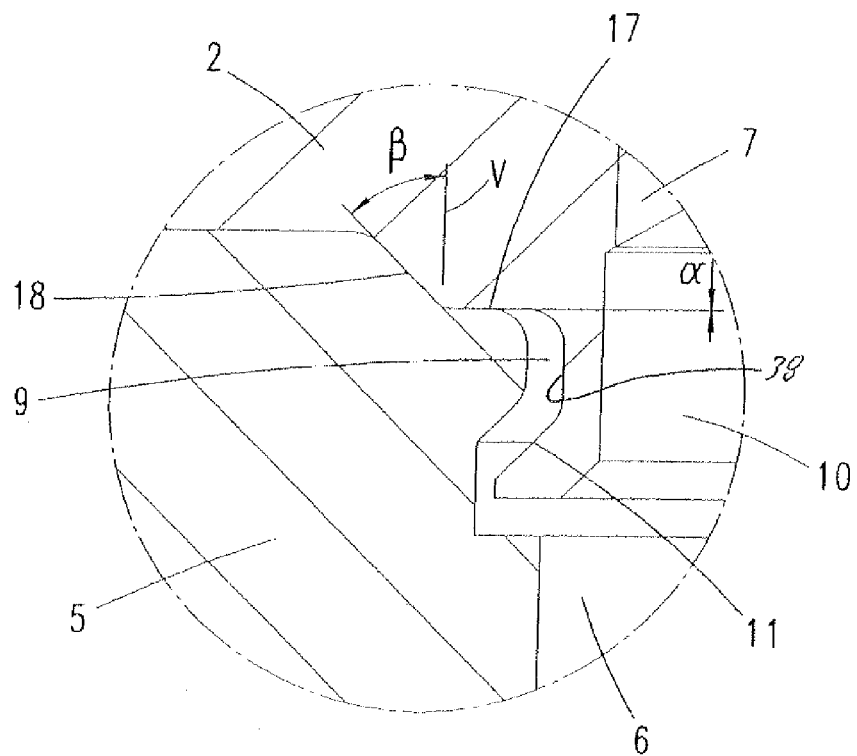

CABLE LUG COMPRISING A NUT OR FUNCTIONAL PART, METHOD FOR THE PRODUCTION OF SUCH A CABLE LUG, AND NUT

This application is a continuation application of U.S. patent application Ser. No. 10/597,668, accorded a filing date of Aug. 9, 2007 under 35 U.S.C. §371 (now abandoned). U.S. patent application Ser. No. 10/597,668 is the National Stage filing of IB application number PCT/EP05/55176, filed Oct. 12, 2005, published as WO 2006/042812 on Apr. 27, 2006. IB application number PCT/EP05/55176 claims priority from German Patent Application No. 10 2005 007 203.8 dated Feb. 17, 2005 and German Patent Application No. 10 2004 050 485.7 dated Oct. 15, 2004, which disclosure is hereby incorporated in its entirety.

FIELD OF THE INVENTION

In first instance, the invention relates to a workpiece or cable lug with a tubular receiving portion for the cable, an integrally formed flat part connecting portion which has a hole, and a nut which is held captively, preferably held to be rotatable, on the flat part connecting portion, the nut not passing through the flat part connecting portion and being held by a reshaped holding material portion of the flat part connecting portion which projects into an undercut formed on said nut.

The invention also relates to a cable lug with a tubular receiving portion for the cable, an integrally formed flat part connecting portion which has a hole, and a functional part which is held captively, preferably held to be rotatable, on the flat part connecting portion, the functional part being held by a holding material portion which projects into an undercut formed on said functional part, this holding material portion being rooted in a region sunk-in in a step-like manner with respect to the unaffected surrounding region of the flat part connecting portion, the undercut being formed with an axial extent which is equal to or less than the axial extent (thickness) of the unaffected flat part connecting portion.

BACKGROUND OF THE INVENTION

Various configurations of cable lugs of this type are already known. Reference is to be made, for example, to DE 10310164 A1.

In terms of the prior art, reference is also to be made to EP 667 936 B2, and furthermore also to U.S. Pat. No. 5,256,019.

The invention also relates to a method for forming a connection, which is captive but allows axial and possibly rotary movement, of a cable lug to a functional part, such as a nut, the cable lug having a tubular receiving portion for the cable and a flat part connecting portion, and the functional part being pressed into the undeformed flat part connecting portion by penetrating or passing through a hole which is formed therein.

In this respect, reference is also to be made to the prior art already mentioned above. In the method known from U.S. Pat. No. 5,256,019, a step-like area is formed in the course of the pressing-in process, this step-like area having two surfaces which run perpendicular to one another, respectively horizontally and vertically. Although this results in the formation of the desired holding material portion, the entire deformed portion enters the region of the flat part connecting portion of the cable lug which is positioned vertically beneath the associated stepped area of the screw or of the functional part.

Finally, the invention relates to a nut, preferably for forming a press-connection with a flat part connecting portion of a cable lug, one end of the nut, in relation to its tightening or loosening direction, having a radially opening undercut which is provided in the axial direction of the nut and has an upper and a lower delimiting surface.

In terms of the prior art, reference is to be made to U.S. Pat. No. 3,253,631, DE 558873 and DE 9412215 U1 in this respect.

In the case of the known cable lugs mentioned in the introduction, the holding material portion is in each case accommodated in the undercut of the nut or the functional part such that said undercut is filled, or the undercut is formed to be very large in the axial direction and formed in one direction by the start of the thread (U.S. Pat. No. 5,256,019). A novel design is sought here, in particular with regard to rotatable retention of the nut or the functional part.

SUMMARY OF THE INVENTION

On the basis of the known method, it is also the object of the invention to provide an advantageous method for press-connection of a functional part, such as a nut, to a cable lug.

Last but not least, it is an object of the invention to provide a nut which can be used advantageously in an item comprising a combination of cable lug and functional part, such as a nut, or when carrying out a method for forming a connection between a functional part, such as a nut, and the cable lug.

With regard to a cable lug with a nut held therein, the object is achieved on the basis of the above-described state of the art in that it is provided that the holding material portion is accommodated in the undercut with an axial clearance. A radial play may also be possibly provided. Firstly, this is advantageous with respect to thermal loading of the connection. As a result of the holding material portion finding space to move in the undercut, certain changes in volume, which are attributable, for example, to different material expansions when heated, can advantageously be accommodated. However, the design solution is itself also inherently directly suited to realizing a rotatable mounting of the nut. Secondly, the inventive concept can, in principle, also be implemented by rotatability being prevented in a positively locking manner, for example by rotation-prevention projections which extend vertically in the seat region of the nut and can be overcome by being lifted.

If a functional part in generic terms is provided, the object is achieved with a cable lug in which provision is in particular made for the step-like sunk-in region to be rotationally symmetrical and have a conical portion which is open outward and upward and has at least one conical surface. The combination of the rotationally symmetrical form with the outwardly and upwardly open conical portion functions effectively against possible undesired jamming of the functional pail in the cable lug. Undesired jamming does not at the same time mean also that prevention of rotation cannot nevertheless still be present.

In terms of the method, the invention provides for a rotationally symmetrical circumferential step-like area to be formed in the flat part connecting portion in the course of the pressing-in process, at least one of the step surfaces being formed as a conical surface running at an acute angle to a horizontal or a vertical. As a result of the step surfaces running in the configuration mentioned, the perpendicular step surface or the step surface which, according to the invention, opens obliquely outward is substantially realized by the deformation. A certain elastic reverse deformation is correspondingly produced following conclusion of the pressing-in process, this elastic reverse deformation tending to lift the functional part. On account of the profiles mentioned of the stepped area, the functional part can be positioned largely free from the step surfaces, and this is advantageously beneficial for the rotatability of the functional part which may possibly be desired.

In terms of the nut, the object is achieved with an item in which it is substantially provided that the undercut is formed to be rotationally symmetrical and the upper delimiting surface is part of a rotationally symmetrical stepped area which is formed on the nut. The upper delimiting surface of the undercut runs directly into said stepped area, which finally always opens upward and outward.

The features of the further claims are explained below substantially in the form of subclaims, however they may also each be important in their own right.

Thus it is advantageous if the step surface which runs at an acute angle to the perpendicular once again runs into a horizontal surface. This horizontal surface is accordingly disposed radially outside said step surface.

It is also preferred for the undercut which is formed on the nut or the functional part to be formed in a region which—at least in relation to the nut—does not have an associated (internal) thread.

The holding material portion is preferably rooted in a portion of the flat part connecting portion which has been sunk-in in a step-like manner with respect to a surrounding region of the flat part connecting portion.

In particular, it is also preferred for said step surfaces to be planar, independently of their oblique orientation relative to a horizontal or vertical.

In terms of the undercut, it is also preferred for the lower delimiting surface of the undercut to extend in a vertical projection over more than half of the associated stepped area in the radial direction, said stepped area being formed at the lower end of the associated actual nut part or head of the functional part. This undercut is also preferably formed independently of the thread and so as not to (radially) overlap a thread of the nut. The inner face of the undercut region is formed to be cylindrical in the case of the nut. The relevant cylindrical surface preferably merges into the root of the internal thread which is formed in the nut. In the axial direction, the undercut preferably extends over a quarter or more of the thickness of the flat part connecting portion.

From the point of view of the method and installation, a procedure is carried out such that the hole in the flat part connecting portion of the cable lug is large enough for the neck of the nut, which neck as noted projects downward and has the undercut, to be easily inserted into the hole. A pressing force is then applied to the nut from above, this pressing force causing said stepped area to be sunk into the material of the flat portion of the cable lug while at the same time bulging out the holding material portion which is formed from the material of the flat part of the cable lug. After the nut is relieved of said pressing force, the nut is captively secured to the cable lug, the nut being at the same time freely rotatable.

The angle—which results in a conical surface—of the rising portion of the stepped area is preferably an acute angle, more preferably in the range of 1 to 60 degrees, still more preferably in the region of 45 degrees. However, the disclosure also includes all relevant intermediate values, for example 2, 3 degrees or 46, 47 degrees etc.

If the stepped area has a step surface which is oriented on a horizontal and a step surface also runs at an angle to the horizontal, this angle is preferably also an acute angle, more preferably in the angular ranges specified above in relation to the rising portion of the stepped area, and to be precise, the angle can in this case be formed such that it counts both positively and negatively. It is further preferred here for the angle of the step surface which is oriented to the horizontal to always be selected to be smaller (in terms of magnitude) than that of the step surface which is oriented to the vertical.

In first instance, the nut with said shaped portions can be produced as a turned part. However it may also be produced, for example, as an extruded pail, said neck portion being integrally formed at the bottom initially in the form of a cylindrical tube, and then in a second step being upset such that the required and described undercut is produced.

The cable lug is preferably one which is formed from a solid material, the flat portion then being pressed by reshaping.

Said connection between the nut, which is generally composed of a steel material which steel by its inherent nature is rigid, or another functional part, and the flat portion of the cable lug is also assisted by the cable lug usually consisting of a comparatively soft material, specifically copper or aluminum. Since the nut is generally composed of a steel material and the cable lug is formed from a comparatively soft material, specifically copper or aluminum, when the flat portion of the cable lug is reshaped by the pressing-in of the nut into the flat portion of the cable lug as described herein, the material of the flat portion inherentl cold-flows into the undercut on the nut as this pressing-in is not described as being performed under the application of heat.

On account of the described configuration of the functional part, pressing-in produces a characteristic compression curve, in first instance specifically with force rising in a comparatively linear manner along the path and then angling off in a second portion of the compression curve in which the force rises more sharply as plotted over the path. This characteristic allows compression to be controlled in an advantageous manner in relation to the pressing force applied. It is possible to prespecify a typical pressing force which is located to a sufficient extent in the steep region of the curve, and be sure that mounting of the functional part on the cable lug appropriately for its function is achieved in each case when this pressing force is reached.

It is also preferred for the hole in the cable lug to be formed with a hole step. The hole step is preferably already provided before the deformation. This is advantageous in respect of connection to a pin on which, in one application, the cable lug is for example to be fitted. This pin, which has a thread at its head end, has a radial projection below the thread. The cable lug outside the hole sits on this area. In order to be able to utilize this projection as advantageously as possible in terms of area, it is recommended to make the hole narrower in the lower region which faces the pin, that is to say to provide it with the said hole step.

In terms of the functional part, in particular the nut, it is also preferred for the horizontal surface to have a circular outer contour. For a conventional nut with a polygonal contour, that is to say for example a hexagonal contour, this can be achieved, for example, by integrally forming a flange, at the lower end, on the head of the functional part, that is to say on the polygonal section of the nut in this case. The top end of this flange has a fitting area which can advantageously be used by a corresponding pressure-exerting tool. As a result of the outer contour being round, the desired rotatability of the nut cannot be prevented, for example by a hexagonal depression due to said nut being pressed into the surface of the flat part connecting portion of the cable lug.

In addition to the nut which has already been mentioned, the functional part in question may also be a screw. Furthermore, it may also be for example a sleeve or a mandrel.

DESCRIPTION OF THE DRAWINGS

The invention is explained in greater detail below with reference to the accompanying drawing which illustrates only exemplary embodiments, and in which

FIG. 4 shows a cross-sectional illustration, which corresponds to FIG. 2, of the item according to FIG. 3;

FIG. 5 shows the item according to FIG. 1 and FIG. 3 in a pressed position;

FIG. 6 shows a sectional illustration, which corresponds to FIG. 2 and FIG. 4, of the item according to FIG. 5;

FIG. 6a shows an enlargement according to the detail VIa from FIG. 6;

FIG. 7 shows an illustration with a nut screwed onto a threaded connecting pin;

FIG. 10 shows an alternative embodiment of a nut which is connected to a cable lug, in perspective view;

FIG. 11 shows a cross-section through the item according to FIG. 10 in the region of the flat part connecting portion;

FIG. 15 shows an enlargement of the region XV in FIG. 14;

FIG. 16 shows an illustration according to FIG. 13, following pressing;

FIG. 17 shows a cross-section through the item of FIG. 16; and

FIG. 18 shows an enlargement of the region XVIII in FIG. 17.

DETAILED DESCRIPTION

Figure 1:
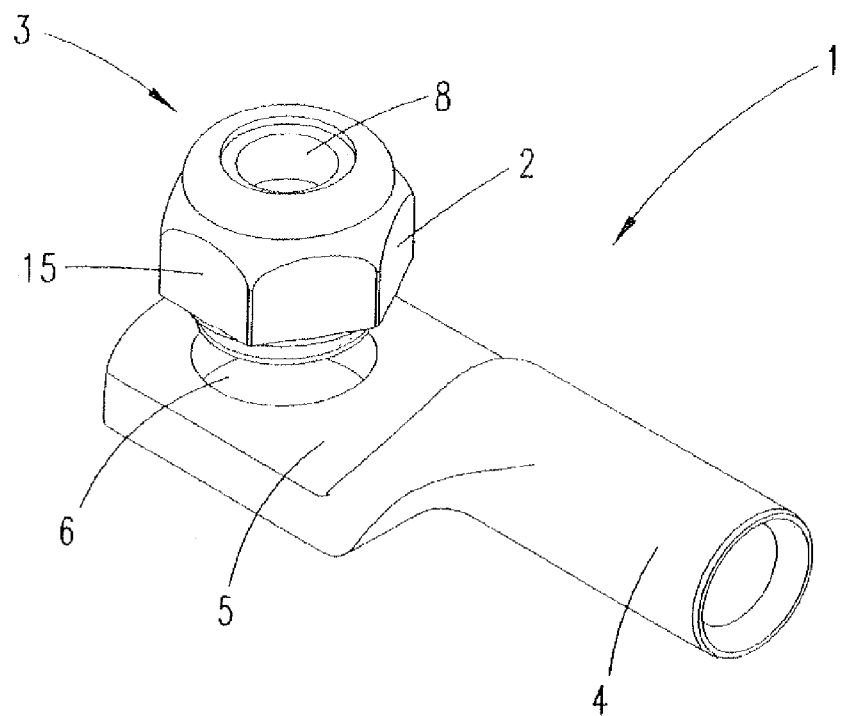
FIG. 1 shows a cable lug with a nut which is associated with the flat part, before pressing.
Figure 2:
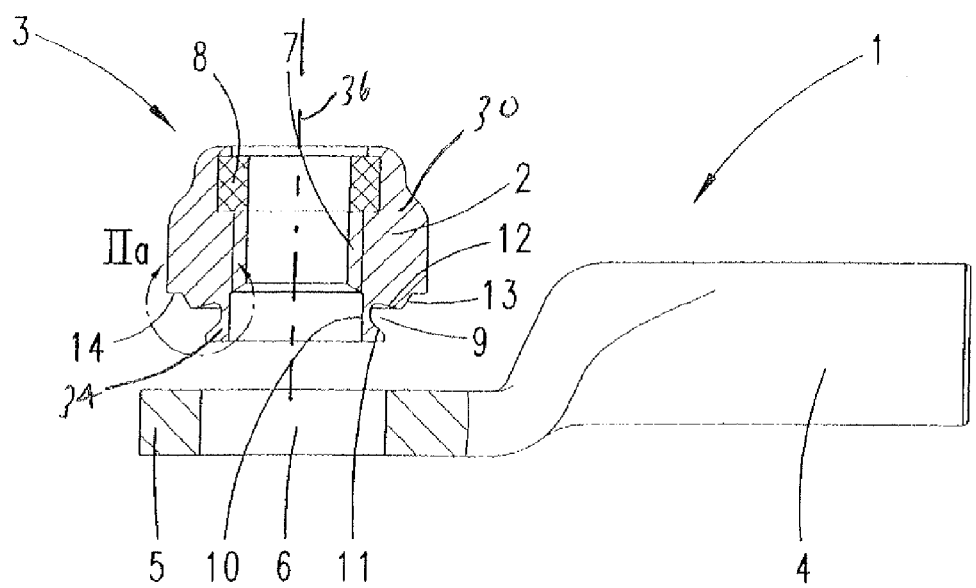
FIG. 2 shows the item according to FIG. 1, sectioned in the region of the flat part.
Figure 2A:
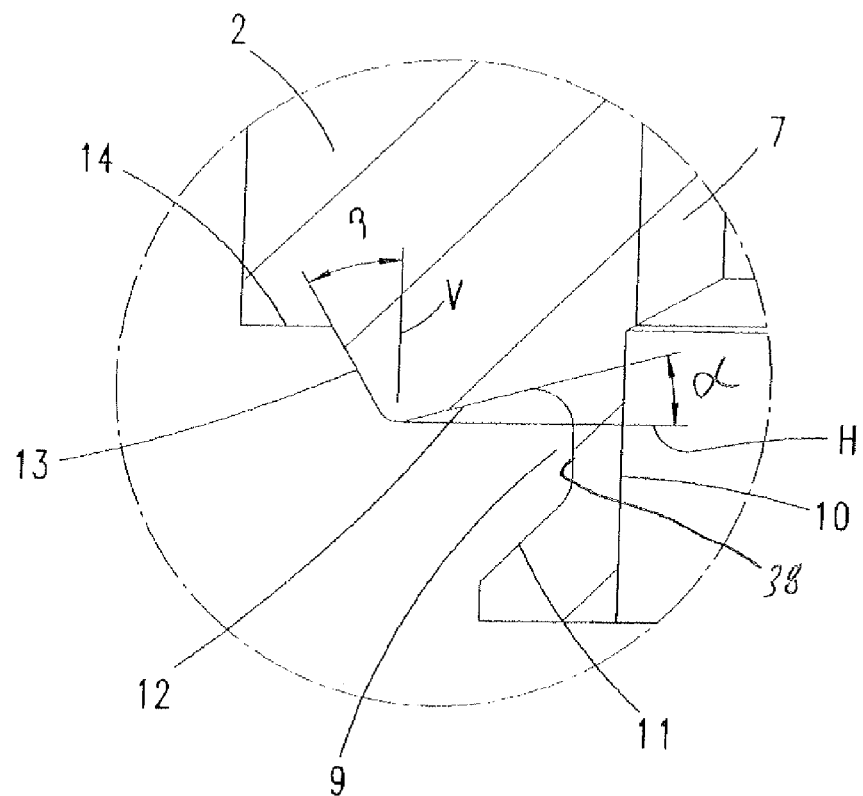
FIG. 2a shows an enlargement according to the detail IIa from FIG. 2.

A cable lug 1 with a functional pail 3, which is in the form of a nut 2 in this case, is presented and described, in first instance with reference to FIGS. 1 to 7.

For a connection between the nut 2 and the cable lug 1 which is secure against coming free, that is to say in a manner secured against becoming detached, but such that the connection is rotatable, the nut 2 is pressed to the cable lug 1, as is shown by FIGS. 5 to 6 in particular.

Specifically, the cable lug 1 has a tubular receiving portion 4 and a flat pail connecting portion 5. The cable 19 is introduced into the tubular portion 4 and then held therein, for example by a press fit, the intention being for electrically reliable connection to be achieved by means of the cable lug 1.

The cable lug 1, which is formed from a solid material in the exemplary embodiment, also has a hole 6 in the already mentioned press-deformed flat part connecting portion 5. In the exemplary embodiment, the nut 2 is inserted into this hole 6 and then connected to the cable lug 1, that is to say specifically to the flat part connecting portion 5, in a captive but rotatable manner, by being pressed down in the manner still to be described.

The nut 2 has a body 30 having an upper portion and a lower portion and a central passageway 32 that extends therethrough. The lower portion has a tubular shank 34 formed thereon. A centerline 36 extends through the center of the body 30. As can be seen in further detail from the illustrations of FIGS. 2, 4 and 6, the nut 2 has an internal thread 7 in the central passageway 32, in the exemplary embodiment with an upper plastic insert 8 in order to prevent the nut 2 from becoming detached. In this respect, there is in question a self-locking nut.

An undercut 9 is integrally formed in the lower portion of the nut 2, at the lower end. In the exemplary embodiment, this undercut 9 is produced by turning on a lathe.

The undercut 9 begins below the lower end of the internal thread 7. On the inner side, the undercut 9 has a cylindrical surface 10 which is axially flush with the root of the internal thread 7.

Specifically, the undercut 9 is formed by a lower delimiting surface 11 and an upper delimiting surface 12 and a generally vertical delimiting surface or neck 38 which connects the lower delimiting surface 11 to the upper delimiting surface 12. The upper delimiting surface 12 is also part of a displacer or stepped area which is formed on the nut 2, at the lower end.

The displacer or stepped area of the nut 2, which is illustrated in detail on an enlarged scale in the magnified illustration, is as it were the negative of the stepped area which is positively formed in the flat part connecting portion 5, in the pressed state.

More specifically, the stepped area comprises an outer, generally vertical surface 13 and the delimiting surface 12 which has already been discussed. Therefore, surface 13 forms a first surface and surface 12 forms a second surface of the displacer or stepped area. In the exemplary embodiments described here, the two surfaces, the delimiting surface 12 and the outer, generally vertical surface 13, extend at an acute angle $\alpha$ and $\beta$ respectively in relation to a horizontal H and a vertical V respectively. Therefore, the outer surface 13 is tapered. The vertical V is parallel to the centerline 36 of the body 30. The horizontal H is transverse to the centerline 36 of the body 30. The acute angle $\alpha$ or $\beta$ is preferably in the range of 1° to 60°, more preferably between 10° and 30° for $\alpha$, and between 20° and 50° for $\beta$. In the exemplary embodiment, the angle $\alpha$ is 15° and the angle $\beta$ is 30°.

The generally vertical surface 13 merges in a radially outward direction into a first bearing or horizontal surface 14 which, however, is formed with a varying radial extent over the circumference on account of the hexagonal form of the nut 2 in the exemplary embodiment.

Figure 3:
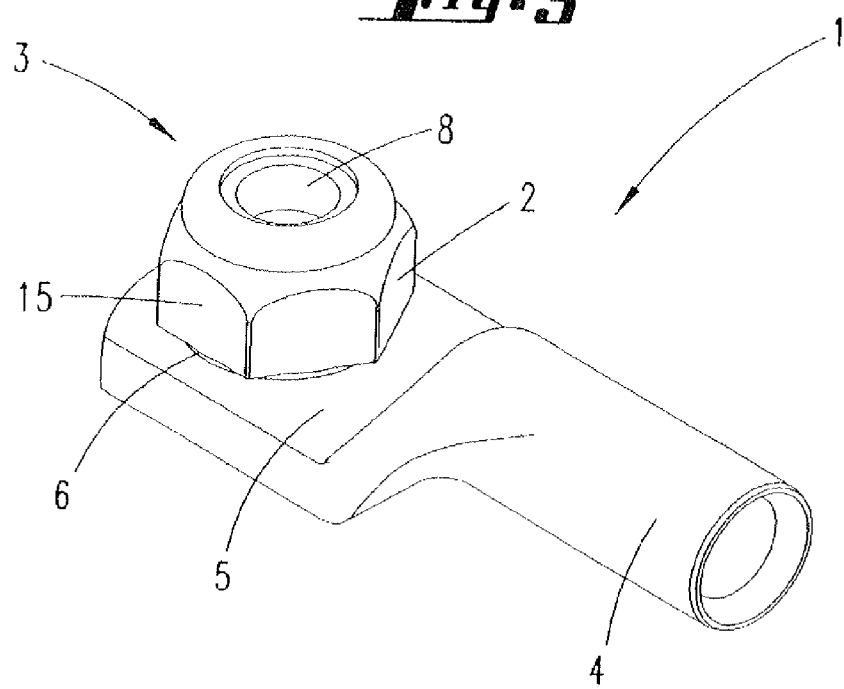
FIG. 3 shows the item according to FIG. 1 in position fitted onto the cable lug.

This varying radial extent of the horizontal surface 14 can be seen in the illustration according to FIG. 3, in which the nut 2 is illustrated in a position fitted onto the flat part connecting portion 5 before pressing. In this case, the hole 6 extends partly, still radially, beyond an associated vertical flat surface 15 of the nut 2.

FIG. 4 illustrates a cross-section through FIG. 3, likewise correspondingly in the state before pressing.

In contrast, FIGS. 5 and 6 illustrate the state following pressing.

It is pertinent that a holding material portion 16 is formed from the flat part connecting portion 5, said holding material portion 16 extending into the undercut 9 of the nut 2. The holding material portion 16 is part of the stepped area which has already been mentioned and is positively formed in the flat part 5 during the pressing-in process of the nut 2 into the flat part connecting portion 5 but, in the same way, has the oblique orientation with respect to a horizontal H or vertical V, as already described. It is clear that upper delimiting surface 12 and generally vertical surface 13 act as a displacer to displace the material of the flat part connecting portion 5 into the undercut 9 during the pressing-in process to thereby form holding material portion 16. In this case, the holding material portion 16 clearly extends radially inward beyond the hole 6 of original diameter which remains in the lower region, seen over the thickness of the holding material portion 16.

The step-like sunk-in region with the step surfaces 17 and 18 which is created in the holding material portion 16 following pressing is formed such that it is rotationally symmetrical over the circumference of the hole 6. That is to say, the area is produced in a notional sense by rotation of a template. There are no undercuts in the area in relation to the direction of rotation of the notional template mentioned (this is naturally an example of shaping as it is used as required in casting molds; this is only mentioned here in order to make clear the nature of the rotationally symmetrical area).

As can be seen, the holding material portion 16 is held in the undercut 9 both with axial and radial play. However, this play is comparatively small, as can be gathered, in terms of magnitude in the region of the thread depth of the internal thread 7 of the nut 2, that is to say in the millimeter range or in the range of tenths of a millimeter.

The holding material portion 16 itself is also formed to be rotationally symmetrical. The undercut 9 completely laterally overlaps the holding material portion 16 in the pressed state.

In FIG. 7, there is illustrated the connection state of the cable lug 1, with the pressed-in cable 19 located therein, to an (electrical) connection part 20. The connection part 20 has a screw pin 21 by means of which the nut 2, which is captively but rotatably press-connected to the cable lug 1, is screwed on. In this way, a desired pressure/butting connection is produced between the lower side of the flat part connecting portion 5 and the upper side of the connection part 20.

Figure 8:
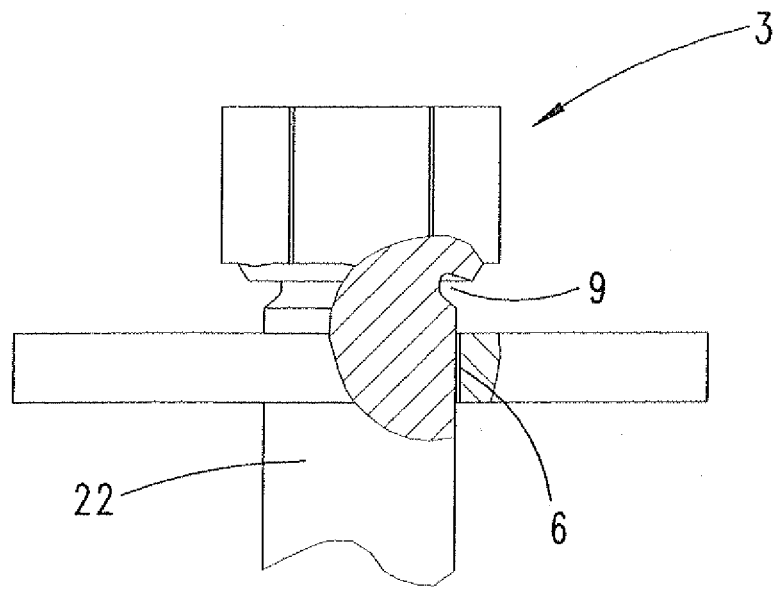
FIG. 8 shows an illustration of a functional part in the form of a screw.
Figure 9:
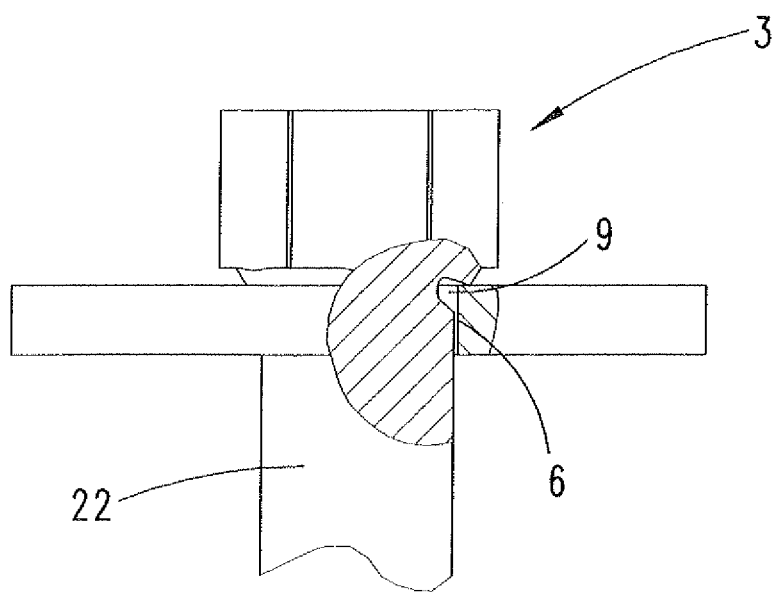
FIG. 9 shows the item according to FIG. 8 with a screw seated on the flat part of the cable lug, before pressing.

The embodiment of FIGS. 8 and 9 shows a functional part 3 in the form of pin 22. Said pin 22 may possibly also be a screw on which a thread can also be formed at the lower end of the undercut 9.

Substantially the same conditions are produced as for the nut 2 described in relation to FIGS. 1 to 7, only now the pin 22 of the functional part 3 passes through the hole 6. For pressing purposes, a counter holder which has a corresponding receptacle or hole 6 for the pin 22 is suitably used here.

It can be gathered with reference to FIGS. 10 and 11, in particular in comparison with FIG. 3 for example, that the nut 2 has an upper shaped portion 23 with an annularly circumferential planar pressing area 24. The required compressive force can be applied to the nut 2 by means of this pressing area 24 using a suitable pressure-exerting tool, in order to form the holding material portion 16 out of the flat part connecting portion 5 of the cable lug 1 in the course of the pressing. The nut 2 is merely pushed into the flat part connecting portion 5 from above, as has also already been described previously. The pressing area 24 is substantially smaller than the projected full surface of the nut 2. It corresponds at least to less than half of this projected complete surface.

The already mentioned plastic part 8 is accommodated within the structure 23, said plastic part being aligned, in a manner corresponding to a self-locking nut and as can also be seen from the cross-sectional illustration according to FIG. 11, with the internal thread line of the screw thread 7 on an inner wall, which wall has a cylindrical shape.

Figure 11A:
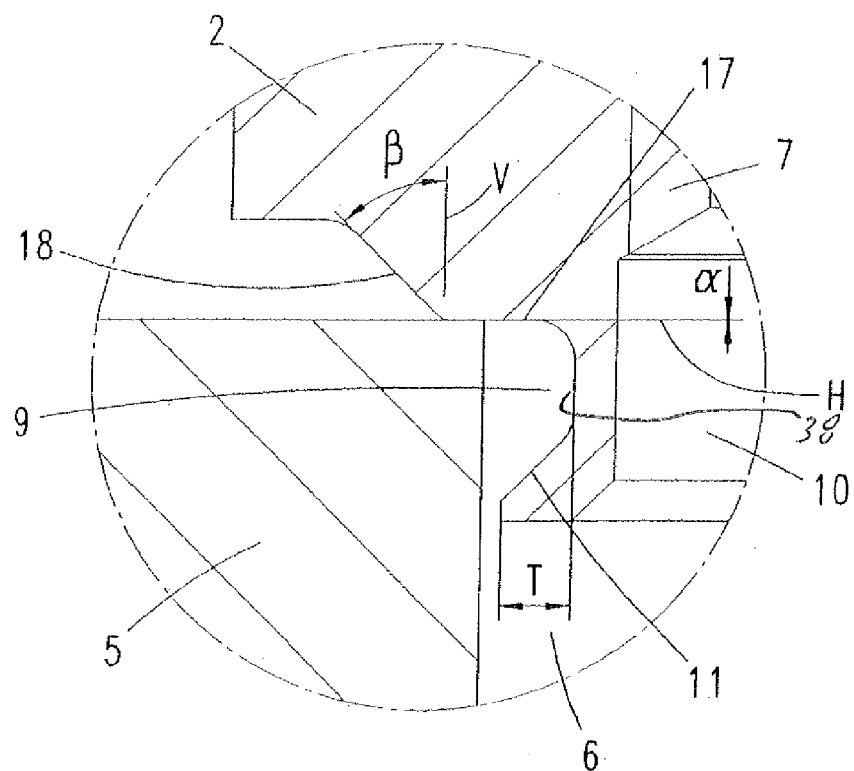
FIG. 11a shows an enlargement according to portion XIa from FIG. 11.

It is also material to the embodiment of FIG. 11, as can also be seen from the detailed illustration of FIG. 11*a*, that the angle α is chosen to be 0° whereas the angle β is chosen to be 45° in this case.

Figure 12:
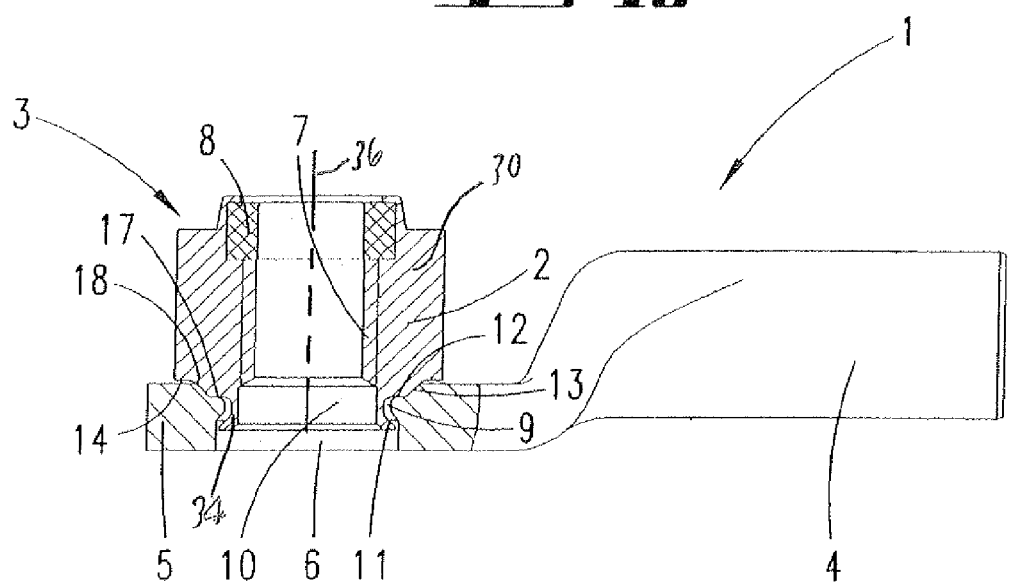
FIG. 12 shows a cross-section through FIG. 11 in the pressed-in state of the nut.
Figure 13:
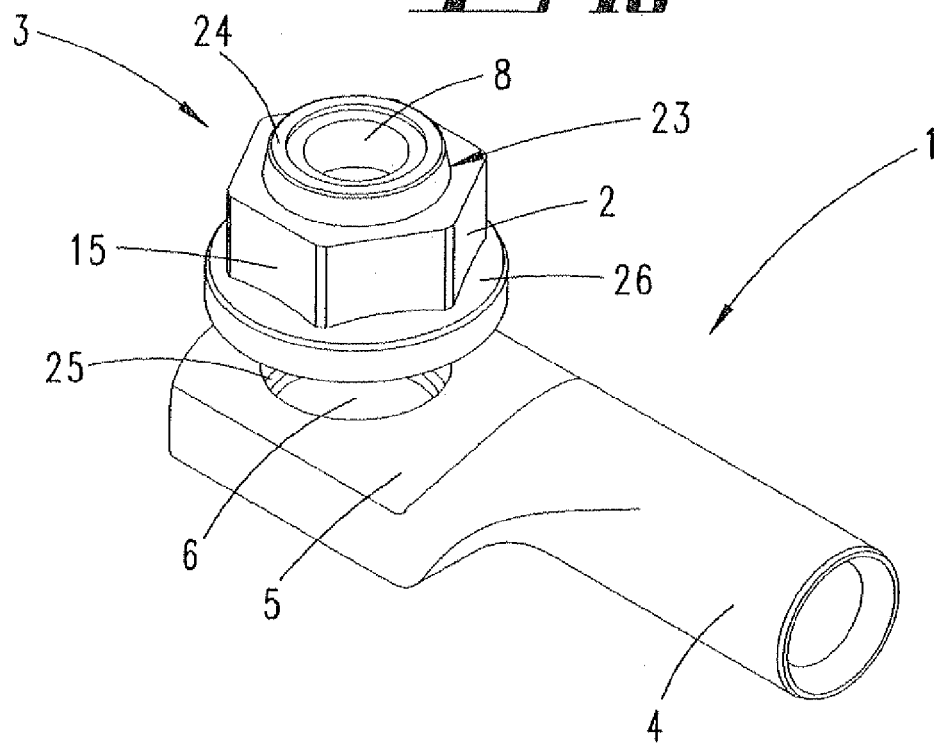
FIG. 13 shows a perspective view of a further embodiment of the functional part in the form of a nut fitted onto the cable lug.
Figure 14:
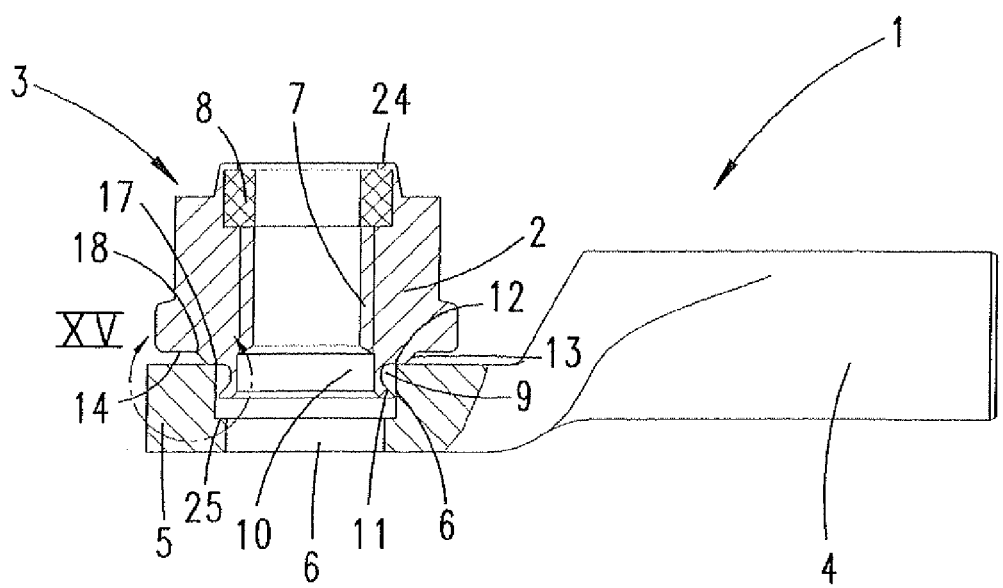
FIG. 14 shows a cross-section through the item according to FIG. 13, before the pressing.

Furthermore, it is pertinent that, as shown in FIG. 12 of this embodiment, the bearing or horizontal surface 14 does not rest on the flat part connecting portion 5 in the compressed state. Instead, it hovers as it were over the flat part connecting portion 5 when the pressing-in is correct. In other words, the pressing force is selected such that, with the given configuration of the stepped area, a pressing-in process is performed only to the extent that the surface 14 does not come to rest on the flat part connecting portion 5, and preferably also without taking into account the elastic recovery which results after the nut is relieved of the pressing force, that is to say in such a way that the surface 14 does not come into contact with the upper surface of the flat part connecting portion 5 at any time in the pressing process.

In first instance, it is pertinent to the embodiment of FIGS. 13 to 18 that the hole 6 is stepped in the axial direction. Starting from a relatively large diameter at the top, which is associated with the functional part, specifically with the nut 3, the diameter of the hole 6 changes to a smaller diameter toward the bottom by way of a hole step 25. The hole step 25 is formed symmetrically with respect to the center of a longitudinal axis of the hole 6.

The hole step 25 serves to increase the area on the lower end of the flat part connecting portion 5 in the vicinity of the hole 6, this because, in one application, the flat part connecting portion 5, together with the nut 3, is fitted and screwed onto a stepped pin which has a thread at its upper end. The flat part connecting portion 5 accordingly has to sit on a relatively narrow, annularly circumferential area of the pin. This seating and therefore contact area can advantageously be increased in size by the described hole step 25.

In terms of production, the procedure followed may be, for example, that the upper portion of the hole 6 is pressed in and then, in a second working step, the lower region of the hole 6 is cut or punched out, leaving the hole step 25. Accordingly, a cut edge can be established in the cable lug 1 in the lower region of the hole 6 and, in contrast, plastic deformation in the upper region.

A radial extent r, compare FIG. 15, of the hole step 25 preferably corresponds to the radial depth T, compare FIG. 11*a* for example, of the undercut 9. Furthermore, said radial depth T of the undercut 9 can also correspond to the vertical height of the vertical surface or the stepped area 13, 17 in this case.

It is also important in the embodiment described here that, in the case of the illustrated nut 3, a circumferential compression flange 26 is integrally formed at the lower end of the nut. This compression flange 26 extends from the lower horizontal surface 14 over a height which corresponds to approximately one third of the vertical height of the head of the functional part, here the nut 3, this height being measured from the horizontal surface 14 up to the pressing area 24.

If a horizontal flange 26, as described here, is provided for the functional part or the nut, the pressing area 24 is no longer of primary importance. Said pressing area 24 may also be dispensed with or formed in the manner illustrated in FIGS. 1 to 7 for example.

The compression flange 26 serves the purpose of enabling a pressure-exerting tool to be fitted. Relatively high compression forces for press-connecting the functional part or the nut 3 to the cable lug 1 can then be applied by means of this compression flange 26.

Since this produces a substantially larger lower horizontal surface 14 than corresponds to the polygonal contour of the nut 3, this is also advantageous in terms of the described pressing process, which can be controlled, specifically as a function of force, up until there is a sharp rise in the pressing force, which signals engagement of the horizontal surface 14 on the flat part connecting portion 5 of the cable lug 1.

The radial extent of the compression flange 26 in relation to a flat face of the polygonal portion of the nut 3 corresponds, in the smallest radial extent, to one twentieth to one fifth of the diameter of the screw 3, as measured in the region of the polygonal portion and centrally with respect to a flattened portion.

The surface, on which the pressure-exerting tool can sit, of the compression flange 26 can run downward in a slightly inclined manner, but can also run horizontally.

The vertical height of the hole 6 in the region of the relatively small diameter, that is to say below the hole step 25 as seen from above, is selected such that the lower termination of the undercut 9 of the functional part does not rest on the step in the pressed state either. In the exemplary embodiment, the screw including the undercut 9 ends, as shown, above the hole step 25 in the pressed state also.

The functional part, specifically the nut 3 of the last-described embodiment, can also be combined with a hole as is further described above. On the other hand, the functional parts as are further described above can also be combined with a hole as is explained in relation to the last-described exemplary embodiment.

All disclosed features are (in themselves) pertinent to the invention. The disclosure content of the associated/accompanying priority documents (copy of the prior application) is also hereby incorporated in its entirety in the disclosure of the application, including for the purpose of incorporating features of these documents in claims of the present application.

The invention claimed is:

1. Nut which can be inserted into a hole in a workpiece, comprising:
   a body having an upper portion and a lower portion and defining a centerline extending through said upper portion and said lower portion, said body having a periphery;
   said periphery of said body at said lower portion having an outer surface which is angled relative to said centerline at an angle of any one of 20 to 50 degrees, said outer surface extending downwardly from said upper portion of said body;
   an undercut formed in the lower portion of said body, said undercut radially opening in an axial direction of the body, said undercut formed of an upper delimiting surface extending from said outer surface such that an upper edge of said outer surface is positioned radially outside the undercut, said upper delimiting surface continuously encircles said body and is angled at a constant angle relative to the centerline of said body, and said undercut further being formed of a lower delimiting surface which continuously encircles said body and is angled relative to the centerline of said body,
   wherein said undercut is adapted to receive a cold flow of metal of the workpiece when the nut is inserted into the hole in the workpiece and wherein said nut is rotatable within the workpiece while being secured against substantial axial displacement relative to the workpiece after said nut is inserted into the hole in the workpiece and receives the cold flow, and
   wherein the nut is devoid of prongs.

2. Nut according to claim 1, wherein said central passageway is threaded with a plurality of threads, and the undercut does not overlap said threads in a radial direction.

3. Nut according to claim 1, wherein said upper portion of said body has a pressing area which is smaller than an overall area projected in the axial direction of said body.

4. Nut according to claim 3, wherein the pressing area is planar.

5. Nut according to claim 1, wherein said undercut includes an intermediate delimiting surface between said upper delimiting surface and said lower delimiting surface, said intermediate delimiting surface being parallel to the centerline, such that a radial extent is defined as the radial distance between said intermediate delimiting surface and an outer end of said lower delimiting surface.

6. Nut according to claim 5, wherein said upper delimiting surface extends from said outer surface to said intermediate delimiting surface, said upper delimiting surface being continuously angled along its length angled relative to a horizontal line which is transverse to the centerline at an angle of any one of 1 to 60 degrees.

7. Nut according to claim 5, wherein said upper delimiting surface extends from said outer surface to said intermediate delimiting surface, said upper delimiting surface being continuously angled along its length angled relative to a horizontal line which is transverse to the centerline at an angle of 0 degrees.

8. Nut according to claim 1, further including a plastic insert provided within said central passageway.

9. Nut according to claim 8, wherein the plastic insert is partly covered by a pressing area provided at an upper end of said body.

10. Nut according to claim 1, further including a horizontal surface on said upper portion of said body, said outer surface merging into said horizontal surface.

11. Nut according to claim 10, wherein the horizontal surface has a circular outer contour.

12. Nut according to claim 10, wherein a radially outer region of the horizontal surface is part of a compression flange which extends radially outwardly from said body.

13. Nut as defined in claim 1, wherein said angle at which said upper delimiting surface extends is at an angle of any one of 0 to 30 degrees relative to a horizontal line which is transverse the centerline.

14. Nut as defined in claim 1, wherein said angle at which said upper delimiting surface extends is at an angle of any one of 10 degrees to 30 degrees relative to a horizontal line which is transverse to the centerline.

15. Nut according to claim 1, wherein said undercut includes an intermediate delimiting surface between said upper delimiting surface and said lower delimiting surface, said delimiting surface being parallel to said centerline.

16. A captive clinch nut for rotatable attachment to an aperture workpiece, comprising:
   a nut body having an axial threaded bore which defines a centerline;
   a first bearing surface on a base of said nut body;
   a displacer unitary with said nut body located directly below said first bearing surface and adapted to receive a cold flow of metal of the workpiece, said displacer having an outer surface extending from said first bearing surface, the displacer inwardly tapered along at least a portion of its outside surface relative to said centerline at an angle of any one of 20 to 50 degrees and having an outside diameter less than an outside diameter of said first bearing surface;

a rigid tubular shank being substantially non-deformable in its unattached free state, unitary with said nut body, and coaxially extending from said displacer, said shank being outwardly flared toward a distal end; and said displacer having a second surface proximate to said shank, said second surface extending between said shank and said outer surface, said second surface continuously encircles said body and is angled at a constant angle relative to the centerline of said body, and wherein said nut is rotatable relative to the workpiece while being secured against substantial axial displacement relative to the workpiece after said nut is inserted into the hole in the workpiece and receives the cold flow, and wherein the captive clinch nut is devoid of prongs.

17. The captive clinch nut of claim 16, wherein said second surface of said displacer is parallel to said first bearing surface.

18. The captive clinch nut of claim 17, further including an outwardly extending flange forming a base of said nut body.

19. The captive clinch nut of claim 16, wherein the outer surfaces of said displacer and said shank are of reduced friction for providing bearing surfaces of said nut against the workpiece.

20. The captive clinch nut of claim 16, wherein said first bearing surface is integral with said nut body.

21. The captive clinch nut of claim 16, further including a head portion having tool-engaging flats on its outer surface.

22. The captive clinch nut of claim 21, wherein said head portion is of hexagonal cross-section.

23. The captive clinch nut of claim 16, wherein said second surface of said displacer is not parallel to said first bearing surface.

24. The captive clinch nut of claim 16, further including a cylindrical neck provided between said displacer and said shank, said neck having an outside diameter less than the outside diameter of said displacer.

25. The captive clinch nut of claim 24, wherein said second surface of said displacer extends from said outer surface to said neck, said second surface of said displacer being continuously angled along its length angled relative to a horizontal line which is transverse to the centerline at an angle of any one of 1 to 60 degrees.

26. The captive clinch nut of claim 24, wherein said second surface of said displacer extends from said outer surface to said neck, said second surface of said displacer being continuously angled along its length angled relative to a horizontal line which is transverse to the centerline at an angle of 0 degrees.

27. An assembly of parts comprising:
a captive clinch nut comprising a nut body having an axial threaded bore, a first bearing surface on a base of said nut body, a displacer unitary with said nut body located directly below said first bearing surface, the displacer inwardly tapered along at least a portion of its outside surface and having an outside diameter less than an outside diameter of said first bearing surface, a rigid tubular shank being substantially non-deformable in its unattached free state, unitary with said nut body, and coaxially extending from said displacer, said shank being outwardly flared toward a distal end, and said displacer having a second surface proximate to said shank, a workpiece having an aperture formed therein, the displacer and shank of said nut body being located within said workpiece and being coaxial with said aperture such that a ductile deformed portion of said workpiece lies proximate to said second surface; and a space between said shank and an inside wall of said workpiece aperture;

said second surface adapted to receive a cold flow of metal of the workpiece and wherein said nut is freely rotatable relative to the workpiece while being secured against substantial axial displacement relative to the workpiece after said nut is inserted into the hole in the workpiece and receives the cold flow.

28. The assembly of parts as defined in claim 27, wherein said nut is axially displaceable from said workpiece a predetermined amount.

29. The assembly of parts as defined in claim 27, wherein the combined lengths of said displacer and said shank are less than the thickness of said workpiece such that said shank does not extend beyond a back side surface of said workpiece.

30. The assembly of parts as defined in claim 29 wherein said nut is composed of a material having a hardness substantially greater than said workpiece.

31. The assembly of parts as defined in claim 30 wherein the portion of said workpiece which lies proximate to said second surface is received therein by the cold flow of metal of said workpiece.

32. An assembly of parts comprising:
a captive clinch nut comprising a nut body having an axial threaded bore, a first bearing surface on a base of said nut body, a displacer unitary with said nut body located directly below said first bearing surface, the displacer inwardly tapered along at least a portion of its outside surface and having an outside diameter less than an outside diameter of said first bearing surface, a rigid tubular shank being substantially non-deformable in its unattached free state, unitary with said nut body, and coaxially extending from said displacer, said shank being outwardly flared toward a distal end, and said displacer having a second surface proximate to said shank;

a workpiece having an aperture formed therein, the displacer and shank of said nut body being located within said workpiece and being coaxial with said aperture such that a ductile deformed portion of said workpiece lies proximate to said second surface; and a space between outside surfaces of said shank and an inside wall of said workpiece aperture, wherein the combined lengths of said displacer and said shank are less than the thickness of said workpiece such that said shank does not extend beyond a back side surface of said workpiece;

said second surface adapted to receive a cold flow of metal of the workpiece and wherein said nut is freely rotatable relative to the workpiece while being secured against substantial axial displacement relative to the workpiece after said nut is inserted into the hole in the workpiece and receives the cold flow.

33. The assembly of parts as defined in claim 32, wherein said nut is composed of a material having a hardness substantially greater than said workpiece.

34. The assembly of parts as defined in claim 33, wherein the portion of said workpiece which lies proximate to said second surface is received therein by the cold flow of metal of said workpiece.

35. A captive clinch nut for rotatable attachment to an aperture workpiece, comprising:
a nut body having an axial threaded bore;
a first bearing surface on a bottom side of side of said nut body;

a displacer unitary with said nut body and located directly below said first bearing surface for receiving a cold flow of metal of the workpiece, the displacer having an outside diameter less than an outside diameter of said first bearing surface, said displacer including an outer surface which is angled relative to said centerline at an angle of any one of 20 to 50 degrees, said outer surface extending downwardly from said nut body, and a lower displacer surface on a bottom side thereof which is not parallel to said first bearing surface;

a rigid tubular shank being substantially non-deformable in its unattached free state, unitary with said nut body, and coaxially extending from said displacer, said shank being outwardly flared toward a distal end;

said lower displacer surface extending between said outer surface and said shank, said lower displacer surface continuously encircles said displacer and is angled at a constant angle relative to the centerline of said body;

wherein a neck of said shank immediately adjacent said displacer has an outside diameter less than the outside diameter of said displacer and less than an outside diameter of said flared end; and wherein said nut is rotatable within the workpiece while being secured against substantial axial displacement relative to the workpiece after said nut is inserted into the hole in the workpiece and receives the cold flow, and wherein said captive clinch nut is devoid of prongs.

36. The captive clinch nut of claim 35, wherein the outer surfaces of said displacer and said shank are of reduced friction for providing bearing surfaces of said nut against the workpiece.

37. The captive clinch nut of claim 35, wherein said first bearing surface is integral with said nut body.

38. The captive clinch nut of claim 35, further including a head portion having tool-engaging flats on its outer surface.

39. The captive clinch nut of claim 38, wherein said head portion is of hexagonal cross-section.

40. The captive clinch nut of claim 35, wherein said first bearing surface is integral with said nut body.

41. The captive clinch nut of claim 35, wherein the outer surfaces of said displacer and said shank are of reduced friction for providing bearing surfaces of said nut against the workpiece.

42. The captive clinch nut of claim 35, wherein said displacer surface of said displacer extends from said outer surface to said neck, said displacer surface of said displacer being continuously angled along its length angled relative to a horizontal line which is transverse to the centerline at an angle of any one of 1 to 60 degrees.

43. The captive clinch nut of claim 35, wherein said displacer surface of said displacer extends from said outer surface to said neck, said displacer surface of said displacer being continuously angled along its length angled relative to a horizontal line which is transverse to the centerline at an angle of 0 degrees.

44. An assembly of parts comprising:

a captive clinch nut comprising a nut body having an axial threaded bore, a first bearing surface on a bottom side of side of said nut body, a displacer unitary with said nut body and located directly below said first bearing surface, the displacer having an outside diameter less than an outside diameter of said first bearing surface, said displacer including a displacer surface on a bottom side thereof which is not parallel to said first bearing surface, a rigid tubular shank being substantially non-deformable in its unattached free state, unitary with said nut body, and coaxially extending from said displacer, said shank being outwardly flared toward a distal end, wherein a neck of said shank immediately adjacent said displacer has an outside diameter less than the outside diameter of said displacer and less than an outside diameter of said flared end, and an undercut between said neck and said displacer;

a workpiece having the aperture an aperture formed therein, the displacer and shank of said nut body being located within said workpiece and being coaxial with said aperture such that a ductile deformed portion of said workpiece lies within the undercut; and a space between said shank and an inside wall of said workpiece aperture;

said undercut receiving a cold flow of metal of the workpiece, wherein said nut is freely rotatable within the workpiece while being secured against substantial axial displacement relative to the workpiece after said nut is inserted into the hole in the workpiece and receives the cold flow.

45. The assembly of parts as defined in claim 44, wherein said nut is axially displaceable from said workpiece a predetermined amount.

46. The assembly of parts as defined in claim 44, wherein the combined lengths of said displacer and said shank are less than the thickness of said workpiece such that said shank does not extend beyond a back side surface of said workpiece.

47. The assembly of parts as defined in claim 46, wherein said nut is composed of a material having a hardness substantially greater than said workpiece.

48. The assembly of parts as defined in claim 46, wherein the portion of said workpiece which lies within said undercut area is received therein by the cold flow of metal of said workpiece.

* * * * *